US009947056B2

United States Patent
Pagan

(10) Patent No.: US 9,947,056 B2
(45) Date of Patent: *Apr. 17, 2018

(54) ANNOTATION-BASED VOTING FOR E-READERS AND SOCIAL NETWORKING ENABLED BROWSERS

(71) Applicant: International Business Machines Corporation, Armonk, NY (US)

(72) Inventor: William G. Pagan, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 59 days.

This patent is subject to a terminal disclaimer.

(21) Appl. No.: 13/893,419

(22) Filed: May 14, 2013

(65) Prior Publication Data

US 2014/0344348 A1    Nov. 20, 2014

(51) Int. Cl.
*H04L 29/08* (2006.01)
*G06Q 50/00* (2012.01)
*G06Q 30/02* (2012.01)

(52) U.S. Cl.
CPC ......... *G06Q 50/01* (2013.01); *G06Q 30/0282* (2013.01); *H04L 67/306* (2013.01)

(58) Field of Classification Search
CPC .. G06Q 50/01; G06Q 30/0282; H04L 67/306; H05K 999/00
See application file for complete search history.

(56) References Cited

U.S. PATENT DOCUMENTS

| 7,080,317 | B2* | 7/2006 | Lebow | G06F 17/24 715/236 |
| 7,954,058 | B2* | 5/2011 | Kalaboukis et al. | 715/753 |
| 8,015,019 | B1 | 9/2011 | Smith et al. | |
| 8,037,147 | B1 | 10/2011 | Herold et al. | |
| 8,037,157 | B2 | 10/2011 | Xiao et al. | |
| 8,041,738 | B2 | 10/2011 | Flaks et al. | |

(Continued)

OTHER PUBLICATIONS

Anonymous, IPCOM000200711D, "A means and apparatus for encoding, as an URL, an arbitrary block of text inside a webpage without the involvement of the content provider," published Oct. 26, 2010.

(Continued)

*Primary Examiner* — Nicholas Taylor
*Assistant Examiner* — Afroza Sultana
(74) *Attorney, Agent, or Firm* — Kurt P. Goudy; Michael J. Chang, LLC

(57) ABSTRACT

Techniques for annotation-based voting for online content are provided. In one aspect, a method for voting for online content is provided which includes associating content selected by a voter from a first content set with a user profile of the voter; identifying the selected content in a second content set upon the second content set being accessed by one or more users socially connected to the voter; and visually accenting the selected content in the second content set. The method may include retrieving profile information for the voter; and associating the profile information for the voter with the selected content in the second content set. The method may further include displaying the profile information for the voter along with the selected content in the second content set.

14 Claims, 2 Drawing Sheets

(56) References Cited

U.S. PATENT DOCUMENTS

| | | | |
|---|---|---|---|
| 8,615,401 B1* | 12/2013 | Price | G06Q 30/0282 |
| | | | 705/1.1 |
| 2007/0130518 A1 | 6/2007 | Shavit et al. | |
| 2008/0052739 A1 | 2/2008 | Logan | |
| 2010/0318893 A1* | 12/2010 | Matthews | G06F 17/241 |
| | | | 715/230 |
| 2013/0097141 A1* | 4/2013 | Kim et al. | 707/706 |
| 2014/0040368 A1* | 2/2014 | Janssens | 709/204 |
| 2014/0047332 A1* | 2/2014 | Liu et al. | 715/273 |
| 2014/0067934 A1* | 3/2014 | Ware | H04L 51/32 |
| | | | 709/204 |
| 2014/0089775 A1* | 3/2014 | Worsley et al. | 715/230 |
| 2014/0108500 A1* | 4/2014 | Zhang | G06Q 10/101 |
| | | | 709/203 |

OTHER PUBLICATIONS

Anonymous, IPCOM000199956D, "Method for sharing weblinks with user highlights," published Sep. 22, 2010.

Bohnstedt et al., "Collaborative Semantic Tagging of Web Resources on the Basis of Individual Knowledge Networks," Proceedings of First and Seventeenth International Conference on User Modeling, Adaptation, and Personalization UMAP 2009, Lecture Notes in Computer Science, vol. 5535, p. 379-384, Jun. 2009.

* cited by examiner

ANNOTATION-BASED VOTING FOR E-READERS AND SOCIAL NETWORKING ENABLED BROWSERS

FIELD OF THE INVENTION

The present invention relates to voting techniques for e-readers and social networking enabled browsers and more particularly, to techniques for annotation-based voting for online content which address the content for the concepts it represents not just the context in which it originally appears.

BACKGROUND OF THE INVENTION

Different social media outlets let users post different things. For example, some social media sites let users post a status, share a link (along with comments about the link), share an image at a remote URL (along with comments about the image), upload an image (along with a caption), etc. Other users can "like" the objects posted.

Users can also "like" web pages. For instance, a user can "like" a web page of a particular celebrity, sports figure, etc. The web pages a user "likes" can then persist in the user's profile such that when someone visits the user's page they will be able to see that the user likes that particular celebrity, sports figure, etc.

With conventional approaches, however, the user's "likes" only attach to a particular posting. In many instances, this provides little utility outside of the context of those postings.

Thus, online content browsing techniques wherein the content can be considered outside of the context of the original posting would be desirable.

SUMMARY OF THE INVENTION

The present invention provides techniques for annotation-based voting for online content which address the content for the concepts it represents not just the context in which it originally appears. In one aspect of the invention, a method for voting for online content is provided which includes associating content selected by a voter from a first content set with a user profile of the voter; identifying the selected content in a second content set upon the second content set being accessed by one or more users socially connected to the voter; and visually accenting the selected content in the second content set. The method may include retrieving profile information for the voter; and associating the profile information for the voter with the selected content in the second content set. The method may further include displaying the profile information for the voter along with the selected content in the second content set.

A more complete understanding of the present invention, as well as further features and advantages of the present invention, will be obtained by reference to the following detailed description and drawings.

DETAILED DESCRIPTION OF PREFERRED EMBODIMENTS

Figure 1:
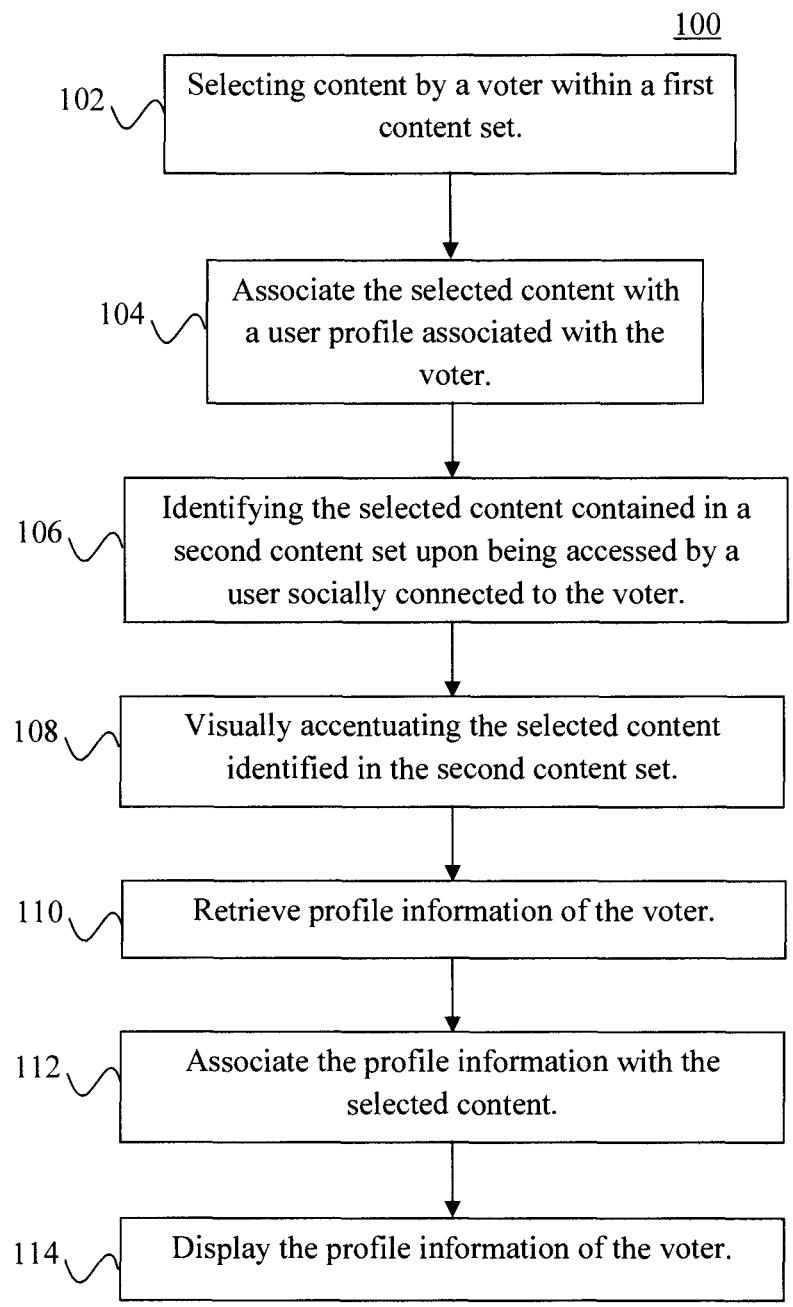
FIG. 1 is a diagram illustrating an exemplary methodology for voting for online content according to an embodiment of the present invention.

Provided herein are techniques that enable users to vote for arbitrary content, such as arbitrary blocks of text, images, etc. using common annotation techniques for use in e-readers and social networking enabled web-browsers. Unlike conventional online voting scenarios, content can be evaluated herein in any context, not just that of the original URL.

Take for example the scenario where a user (also referred to herein as a "voter"—since he/she will be annotating content with tags such as "like" or "recommend") finds content that he/she wants to highlight. According to an exemplary embodiment, the content is text that the user/voter sees online. The user/voter can then annotate the content with a tag such as "like" or "recommend." With conventional online voting techniques, users socially connected to the user/voter will receive a notification that the user/voter has tagged the online content. For example, those users socially connected to the user/voter might receive a notification with a link to the original URL where the user/voter found the content. These users may in turn vote for that content as well, if so desired.

A drawback to this conventional approach is that the content in question is only ever considered in its original context via link to the original URL where it appears. Thus, if the user/voter tags content from an article he/she recommends on a particular webpage then other users (socially connected to the voter) can know to access that webpage and view the article. While it may be sufficient in some situations to show others where they may access the content, it is oftentimes of limited use merely to link someone to a particular URL. For instance, if the user/voter finds the text "cookies" or an image of a cookie in an online advertisement for a particular brand of cookies and the user/voter likes cookies, then he/she can tag the textual content "cookies" or the image of a cookie with, e.g., thumbs-up or some other approval-related accentuation (see below). The user/voter is thus saying that he/she likes cookies in general. The user/voter does not necessarily want to link others to the advertisement for that particular brand of cookies. Alternatively, if the user/voter dislikes cookies then he/she can in the same manner accent the text "cookie" or an image of a cookie with, e.g., a thumbs-down or some other disapproval-related accentuation which indicates that the user/voter dislikes cookies in general.

As compared to conventional processes, the present techniques advantageously address online content for the concepts it represents not just the context in which it originally appears. Namely, as will become apparent from the following description, according to the present techniques when the user/voter annotates online textual content (e.g., the word "cookies," an image of a cookie, etc. in the example above) that content will be highlighted whenever it is encountered by the user and/or by those users socially connected to the user/voter. Thus, again using the example of the word "cookies," whenever a user socially connected to the voter encounters the text "cookies" while browsing the Internet, using an e-reader, etc. the user will be notified that the voter has tagged this text. Thus, the user can then know that the voter likes cookies, i.e., the voter likes the concept of cookies. The tags or other indicators the user/voter can use to accentuate the content he/she selects could, by way of example only, be an icon placed next to highlighted, bolded, circled, magnified, or somehow otherwise accented text, a border placed around an image, etc. It is preferable that whatever accenting method is used it does not obscure the content being illuminated, but only serves to bring it to the attention of the viewer. Further, while the accenting used might merely highlight the content, it is preferable that the accenting further conveys to the viewer more information about the preferences of the user/voter to the content. There are many ways in which this can be implemented, but for illustrative purposes, a color-coding scheme may be employed to indicate user/voter preferences. For instance, text the user likes can be highlighted, underlined, circled, etc. in one color and text the user dislikes in another color. The same convention may be used to place color-coded borders around image content the user/voter selects. Other examples include using icons, such as a thumbs-up and a thumbs-down icon next to content (text, image, etc.) the user likes/dislikes, respectively. A smiling face and a frowning face icon can be used in the same manner. Color-codings and icons may be used separately or in conjunction with one another and are preferably selectable based on the user/voter's preferences (user-configurable/customizable).

The term "socially connected," as used herein refers to a social network of users that are connected to one another through the Internet or other network. By way of example only, users may become socially connected to one another by participation in a social networking site and agreeing to connect with one another. For instance, with the professional networking site Linkedin®, users can send requests to other users to join their network. Once the requests are accepted, these users are socially connected. A user is also 'socially connected' to him/herself. Thus a user/voter will see content he/she has tagged as well as that tagged by his/her friends.

The present techniques are now described in detail by way of reference to FIG. 1 which depicts an exemplary methodology 100 for voting for online content. The term "voting," as used herein, refers to a user/voter indicating his/her approval/disapproval of online content. As highlighted above, the online content can include textual content (e.g., the word "cookies") and/or images (e.g., an image of a cookie), etc. Thus, the user/voter will be voting for content (text, images, etc.) he/she finds online. Namely, in step 102, when viewing online content, the user/voter can select content that he/she wants to highlight. Multiple web-based annotation tools are commercially available and may be used in accordance with the present techniques. By way of example only, Annotate available from Textensor limited can be used to annotate documents, images, etc. online.

For instance, the user/voter may find a particular quote on a webpage that he/she finds to be of interest. In step 102, the user would then annotate or otherwise highlight that quote on the webpage. The user might also find an image on that same webpage that he/she would like to highlight for his/her socially connected users. In step 102, the user would, in the same manner, annotate or otherwise highlight that image on the webpage. Some exemplary highlighting/annotation techniques involving color-coding, icons, etc. were described above.

Further, in addition to accenting or highlighting the content, the user might also indicate whether he/she likes/approves or dislikes/disapproves of the content. For instance, if the image on the webpage is that of a sports figure of which the user is a fan, the user can accent the image for example with a color-coded border that indicates approval and/or an icon (e.g., a thumbs-up), etc. If the quote, on the other hand, is a negative review of the sports figure, the user/voter might want to accent the quote but also show his/her disapproval—again using, e.g., color-coded highlighting, icons (e.g., a thumbs-down), etc. Thus, according to the present techniques, every time a user socially connected to the user/voter encounters an image of the sports figure in content they are viewing (in any context) that image will be highlighted indicating that the user/voter wished for that image to be accented, and preferably indicates the user/voter's approval (or disapproval) of the image, as described above.

Therefore, if a user socially connected to the user/voter is viewing a webpage of a charity fundraiser the sports figure attended, and an image of the figure appears on the page, the present techniques will serve to accent the image in the manner that the user/voter implemented when he/she saw the content. This example illustrates that the content in which the user/voter and subsequent users view the content is completely different. It is notable that the user/voter him/herself will also see the content he/she highlighted as well when it appears in other contexts. The same applies to the quote (i.e., textual content—mentioned above). Thus, anytime users socially connected to the user/voter come across the quote (in any context) that quote will be accented in the manner described above.

Advantageously, the present techniques provide intelligent content rendering capabilities which permit the content that is annotated/highlighted by the voter/user in step 102 to be appreciated by those socially connected to the voter/user for the content and concepts the content represents. By comparison, conventional processes provide no such higher level utilization.

To again use another simple example to illustrate the present concepts, say for instance the voter/user is a student who just passed a major examination. While browsing the Internet the user/voter comes across a webpage for a company offering test preparation services. The webpage has the text "I passed my test!" on it. The use/voter can highlight that text. Users socially connected to the user/voter when alerted to this text (see below) can then congratulate the user/voter on passing his/her test. Thus, the concept of the content (in this example text) is being appreciated by the user/voter's connections. Further, say for instance, that the user/voter found this text on a webpage for medical school examination preparation services and the user/voter is in law school. While the content of the text is applicable to the situation (the user/voter has just passed a test), the original context is not (the user/voter is not in medical school). According to the present techniques, the content selected by the user/voter can be appreciated in a context outside of that of the original webpage. By comparison, conventional processes would merely link users socially connected to the user/voter to the original webpage for medical school test preparation services.

In order to offer this higher level utilization of the content, in step 104, the content selected by the user/voter in step 102 is associated with a user profile of the user/voter. A user profile is a collection of data specific to a particular user. As is known in the art, a user profile might contain data about a user such as age, occupation, etc. What is notable here is that a user profile is specific to a particular user. Thus, by associating the selected content with the user/voter's profile, the content can be uniquely tied to the user/voter and thus accessible by those users socially connected to the user/voter. Accordingly, by associating the selected content with the user/voter's profile the content can be linked to those users socially connected to the user/voter.

When users socially connected to the user/voter are viewing content online, in step 106, the content (e.g., text, images, etc.) selected in step 102 by the user/voter is identified whenever it is encountered in the content they are viewing—regardless of the context in which it appears. For ease and clarity of description, the content in which the user/voter finds the selected content is also referred to herein as "a first content set" so as to distinguish it from the content viewed by the users socially connected to the user/voter which is also referred to herein as "a second content set." Further, the first content set and the second content set may contain the same or different content. For instance, the user/voter might view content on a particular webpage and his/her socially connected users might also be viewing content on that same webpage and/or on a different webpage. Thus, the terms first and second content are being used herein to distinguish different viewers and different viewing instances.

The content selected in step 102 can be identified in the second set of content using commercially available software for finding, e.g., text and/or image matches in different content sets. By way of example only, when the selected content contains an image, commercially available image recognitions software (such as Google Goggle) can be used to find that same image in different content sets.

In step 108, the content (text, images, etc.) identified in step 106, when encountered by the users socially connected to the user/voter in the second content set, is visually accented in the second content set. According to an exemplary embodiment, visually accenting the text includes highlighting, circling, magnifying, or any other suitable means for drawing users' attention to the presence of the selected content in the second set of contents. See above. Further, as described above, this accenting of the selected content may include indications of the user/voter's preferences with regard to the content, e.g., likes/approves, dislikes/disapproves, etc.

Using the example above, if a user socially connected to the voter/user is viewing a webpage that contains the text "I passed my test!" then as per step 108 that text will appear highlighted on the webpage the user is viewing in a way that draws the user's attention to the text. Further, as provided below, the accented text may also be accompanied by profile information for the user/voter who selected the text. Thus, in the instant example, the user viewing the second content set, when he/she sees the accented text, might choose to send a message to the user/voter congratulating him/her on passing the test.

For example, in step 110, in addition to visually accenting the selected content in the second content set, profile information for the user/voter is retrieved. A user's profile may be found in a multitude of places. For instance, a profile for a user may be maintained by the operating system the user employs. Further, individual programs the user uses may each keep their own profile for the user, as well as any online networking sties to which the user belongs, etc. According to an exemplary embodiment, in step 110 data is extracted from one or more profiles available for the user. This can include browsing online and/or on the user's system to find and retrieve this profile data.

Next, in step 112, the user/voter profile information retrieved in step 110 is then associated with the selected content in the second content set. Thus, every time a user socially connected to the user/voter encounters the selected content, the selected content is visually accented and the user/voter profile information is associated with the content. It is notable that the steps of methodology 100 do not need to be performed in the order shown in FIG. 1. For example, when the user selects the content in the first content set, if so desired, the user/voter's profile information may then be automatically retrieved and associated with the selected content.

Lastly, along with visually accenting the selected content in the second content set, in step 114, the user/voter's profile information may be displayed along with the accented content. By way of example only, a thumbnail image of the user/voter and/or his/her name may then be displayed next to (or in some other way associated with) the selected content. It is assumed in most cases that users who are socially connected would recognize one another based on a photo image and/or name. However, it may be advantageous to include additional user profile information—such as a user's profession—which might provide more context to the interaction. For instance, with a professional networking scenario users are generally interested in one another's profession, title, degrees, etc.

Again using the simple example provided above, whenever those users socially connected to the user/voter encounter the text "I passed my test!" when viewing online content (i.e., the second content set), in addition to visually accenting the text, a caption might appear that has a picture of the user/voter and his/her name. Thus, the user(s) (viewing the second content set) can immediately associate the selected text with that user/voter. To date, no techniques exist that provide such high-level, intelligent browsing capabilities.

Figure 2:
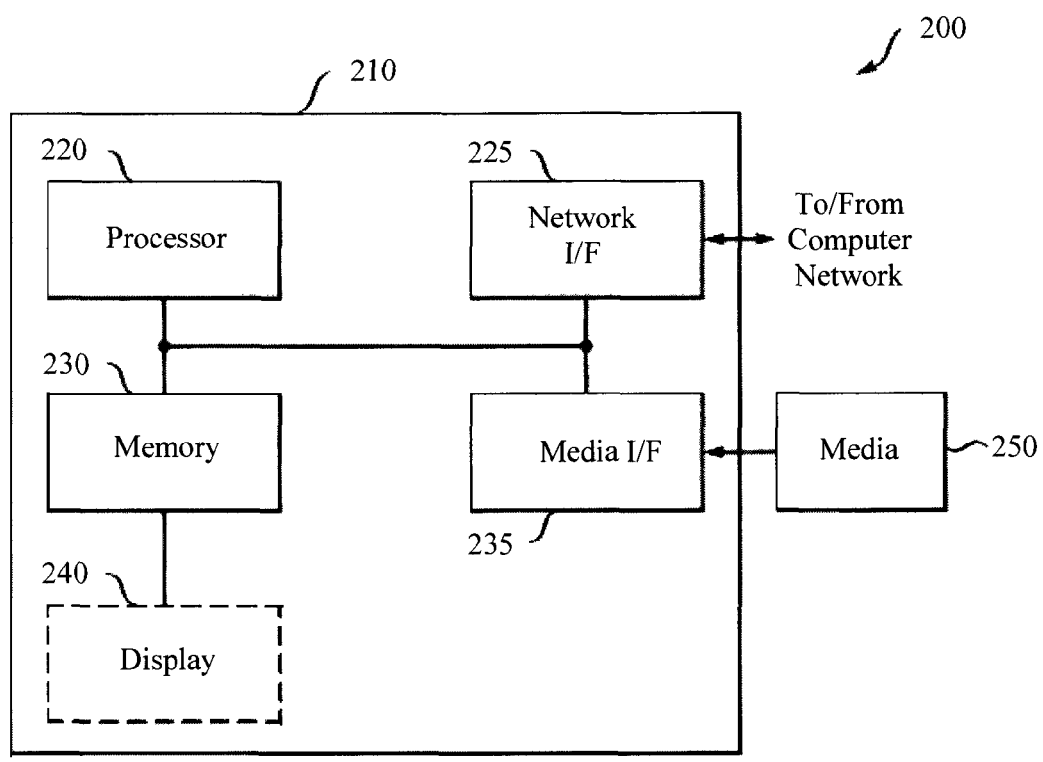
FIG. 2 is a diagram illustrating an exemplary apparatus for performing one or more of the methodologies presented herein according to an embodiment of the present invention.

Turning now to FIG. 2, a block diagram is shown of an apparatus 200 for implementing one or more of the methodologies presented herein. By way of example only, apparatus 200 can be configured to implement one or more of the steps of methodology 100 of FIG. 1 for voting for online content.

Apparatus 200 comprises a computer system 210 and removable media 250. Computer system 210 comprises a processor device 220, a network interface 225, a memory 230, a media interface 235 and an optional display 240. Network interface 225 allows computer system 210 to connect to a network, while media interface 235 allows computer system 210 to interact with media, such as a hard drive or removable media 250.

As is known in the art, the methods and apparatus discussed herein may be distributed as an article of manufacture that itself comprises a machine-readable medium containing one or more programs which when executed implement embodiments of the present invention. For instance, when apparatus 200 is configured to implement one or more of the steps of methodology 100 the machine-readable medium may contain a program configured to associate content selected by a voter from a first content set with a user profile of the voter; identify the selected content in a second content set upon the second content set being accessed by one or more users socially connected to the voter; and visually accent the selected content in the second content set. The program may be configured to retrieve profile information for the voter; and associate the profile information for the voter with the selected content in the second content set. The program may be further configured to display the profile information for the voter along with the selected content in the second content set.

The machine-readable medium may be a recordable medium (e.g., floppy disks, hard drive, optical disks such as removable media 250, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 220 can be configured to implement the methods, steps, and functions disclosed herein. The memory 230 could be distributed or local and the processor device 220 could be distributed or singular. The memory 230 could be implemented as an electrical, magnetic or optical memory, or any combination of these or other types of storage devices. Moreover, the term "memory" should be construed broadly enough to encompass any information able to be read from, or written to, an address in the addressable space accessed by processor device 220. With this definition, information on a network, accessible through network interface 225, is still within memory 230 because the processor device 220 can retrieve the information from the network. It should be noted that each distributed processor that makes up processor device 220 generally contains its own addressable memory space. It should also be noted that some or all of computer system 210 can be incorporated into an application-specific or general-use integrated circuit.

Optional display 240 is any type of display suitable for interacting with a human user of apparatus 200. Generally, display 240 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for voting for online content, the method comprising:
   automatically associating content selected by a voter from a first content set with a user profile of the voter when the voter selects the content, wherein the first content set comprises a first webpage viewed online by the voter, wherein the content selected by the voter comprises content within the first content set which the voter has chosen to highlight on the first webpage, and wherein the content selected by the voter is a text or an image that itself conveys a message from the voter to users socially connected to the voter in any context in which the selected content is found;
   identifying the selected content when encountered in a second content set upon the second content set being accessed by one or more of the users socially connected to the voter, wherein text or image matching is used to identify the selected content in the second content set whenever the users socially connected to the voter are browsing online and happen upon the selected content, wherein the second content set comprises a second webpage accessed online by the users socially connected to the voter in which the selected content happens to appear, and wherein the first webpage presents the selected content in one particular context while the second webpage presents the same selected content in another particular context that is different from the first webpage, whereby the selected content is identified in the second content set based solely on the voter and the one or more users socially connected to the voter belonging to a same social network of users through the selected content being automatically associated with the user profile of the voter and, through that association with the user profile of the voter, linked to the one or more users socially connected to the voter, and whereby the selected content is undistinguished to users outside of the same social network of users that also happen to access the second webpage; and
   visually accenting the selected content in the second content set by highlighting the selected content and displaying the highlighted selected content to the one or more users socially connected to the voter in the second content set on a display in which the second webpage as displayed is changed to include the highlighting of the selected content, wherein the highlighting comprises accenting content approved and disapproved by the voter.

2. The method of claim 1, wherein the first content set and the second content set contain the same or different content as one another.

3. The method of claim 1, further comprising:
   retrieving profile information for the voter; and
   associating the profile information for the voter with the selected content in the second content set.

4. The method of claim 3, further comprising:
   displaying the profile information for the voter along with the selected content in the second content set.

5. The method of claim 3, wherein the profile information retrieved for the voter comprises an image of the voter.

6. The method of claim 3, wherein the profile information retrieved for the voter comprises a name of the voter.

7. The method of claim 1, wherein the selected content comprises text.

8. The method of claim 1, wherein the selected content comprises images.

9. The method of claim 1, wherein the selected content is visually accented so as to convey a preference of the voter with regard to the selected content.

10. The method of claim 9, wherein the preference of the voter with regard to the selected content comprises an approval or a disapproval of the selected content.

11. The method of claim 1, wherein the selected content in the second content set that is visually accented is one or more of bolded, circled, or magnified.

12. The method of claim 1, wherein the selected content in the second content set is visually accented using a color coding scheme.

13. The method of claim 12, wherein the color coding scheme comprises visually accenting the content approved by the voter using one color, and visually accenting the content disapproved by the voter using another color.

14. The method of claim 12, wherein the color coding scheme comprises placing a color-coded border around the selected content using one color to visually accent the content approved by the voter and another color to visually accent the content disapproved by the voter.

\* \* \* \* \*